United States Patent [19]

Gerk et al.

[11] Patent Number: 4,661,027
[45] Date of Patent: Apr. 28, 1987

[54] TOOL CARRIERS AND UNBALANCE COMPENSATING MEANS

[76] Inventors: Wilfried Gerk, Amselstr. 10, 6074 Rödermark; Gerhard Klee, Fuchshohl 102, 6000 Frankfurt-Ginnheim, both of Fed. Rep. of Germany

[21] Appl. No.: 810,579

[22] Filed: Dec. 19, 1985

[30] Foreign Application Priority Data

Dec. 19, 1984 [DE] Fed. Rep. of Germany ....... 3446275

[51] Int. Cl.$^4$ .............................................. B23B 51/00
[52] U.S. Cl. ................................... 408/151; 408/143; 408/157
[58] Field of Search ............... 408/157, 143, 180, 181, 408/182, 714, 150, 151, 154

[56] References Cited

U.S. PATENT DOCUMENTS 4,278,372 7/1981 Heisner ........................... 408/157 X

FOREIGN PATENT DOCUMENTS 2034601 1/1972 Fed. Rep. of Germany .
2931508 2/1981 Fed. Rep. of Germany ...... 408/157
946619 1/1964 United Kingdom ................ 408/157

*Primary Examiner*—William R. Briggs
*Attorney, Agent, or Firm*—Hill, Van Santen, Steadman & Simpson

[57] ABSTRACT

A revolving drill head or the like with finely adjustable tool carriers at right angles to its longitudinal axis having high rigidity material-elastic intermediate members operable by a hydraulic pressure medium supplied coaxially to the shaft of the drill head in a feed mechanism, which is positioned in fixed manner between the shaft and the tool carrier and having two flange-like connecting parts to the shaft or tool carrier connected by two axially parallel, resilient parts at right angles to the shaft axis as a parallel guide and with counter-directed, diametrically facing shaft axis parallel extensions which are symmetrical to and spaced from the shaft axis and between which is provided an expansion member as a material-elastic intermediate member in a plane at right angles to the shaft axis, each of the flange-like connecting parts has a compensating device diametrically facing with respect to the shaft axis the extension fixed thereto for compensating its unbalance in at least one relative position of the one flange-like connecting part with respect to the other flange-like connecting part and the flange-like connecting parts are jointly surrounded by a cylindrical sleeve, characterized in that the sleeve for forming the compensating means comprises two pipe parts (28), (30) with in each case an eccentric center of gravity with respect to the shaft axis and whereof each is fixed to one of the flange-like connecting parts (5), (6) and which can be freely moved against one another at least to the extent of the relative movement thereof on operating the feed mechanism.

6 Claims, 4 Drawing Figures

TOOL CARRIERS AND UNBALANCE COMPENSATING MEANS

BACKGROUND OF THE INVENTION

The present invention relates to a revolving drill head or the like with finely adjustable tool carriers at right angles to its longitudinal axis having high rigidity material-elastic intermediate members operable by a hydraulic pressure medium supplied coaxially to the shaft of the drill head in a feed mechanism, which is positioned in fixed manner between the shaft and the tool carrier and having two flange-like connecting parts to the shaft or tool carrier connected by two axially parallel, resilient parts at right angles to the shaft axis as a parallel guide and with counter-directed, diametrically facing shaft axis parallel extensions which are symmetrical to and spaced from the shaft axis and between which is provided an expansion member as a material-elastic intermediate member in a plane at right angles to the shaft axis, each of the flange-like connecting parts has a compensating device diametrically facing with respect to the shaft axis the extension fixed thereto for compensating its unbalance in at least one relative position of the one flange-like connecting part with respect to the other flange-like connecting part and the flange-like connecting parts are jointly surrounded by a cylindrical sleeve.

In the case of the drill head of the aforementioned type described in German Pat. No. 20 34 601 for reducing or eliminating the unbalance of the arrangement occurring through the tool carrier or the forces exerted by it on the drilling spindle and on the feed mechanism the extensions fixed to the flange parts have diametrically facing, special balance weights, which ensure that the centre of gravity of the arrangement is in the shaft axis or rotation axis of the drill head in at least one position of the feed mechanism. The cylindrical sleeve surrounding the two flange-like connecting parts is used for protecting the inner parts against contamination.

The known drill head with the construction of the unbalance compensating means provided therein has proved satisfactory in principle. However, it has proved desirable to further simplify the construction of the feed mechanism by reducing the number of components necessary.

The problem of the present invention is to improve the aforementioned drill head so that on further simplifying the construction, it is possible to cut down on manufacturing costs and also the weight, whilst further increasing the operating reliability due to the simpler construction.

SUMMARY OF THE INVENTION

According to the invention, this problem is solved in that the sleeve for forming the compensating means comprises two pipe parts with in each case an eccentric centre of gravity with respect to the shaft axis, whereof each is fixed to one of the flange-like connecting parts and at least to the extent of the relative movement thereof during the actuation of the feed mechanism can be moved freely against one another.

According to a preferred embodiment of the invention, the pipe parts essentially have the same wall thickness throughout and can have different heights over there circumference whilst producing in each case an axially projecting compensating zone in the circumferential area in each case diametrically facing the extension.

According to the invention, the drill head can also be constructed in such a way that the pipe parts are separated from one another by a slot, which in the circumferential area of the compensating zones has parallel portions of reduced axial height essentially running in a plane at right angles to the shaft axis and between which there are connecting portions of greater width.

It can in particular be provided that the connecting portions are set back in sloping manner to the plane perpendicular to the shaft axis and a further development of this embodiment of the invention is characterized in that the angle of the path of the connecting portions to the plane at right angles to the shaft axis approximately 45°.

A further embodiment of the invention is characterized in that a protective sleeve surrounding the pipe parts and which is fixed to the latter and whose internal diameter in the vicinity of the other pipe part is larger than the external diameter thereof by the amount necessary for the relative movement between the flange-like connecting parts.

The invention is based on the surprising finding that it is possible, as in the known drill head, to displace the centre of gravity of the arrangement at at least one position of the feed mechanism in the rotation axis without special balance weights being required for compensation purposes. The cylindrical sleeve, which in the prior art exclusively acts as an external protective sleeve, is so constructed according to the invention that it on the one hand reliably protects from dirt the inner parts and on the other balances the arrangement. The embodiment of the invention with connecting portions of the slot sloping with respect to the plane at right angles to the shaft axis has the particular advantage that in the case of a possible break of the parallel guide springs which preferably realize the material-elastic intermediate members, the other flange-like connecting part which is only connected by these to the first flange-like connecting part cannot fly off causing considerable hazards and instead through the hooking together of the two connecting parts due to the sloping arrangement of the connecting portions it is firmly secured. This protection against the risks occurring on spring fracture can, in the claimed manner, either additionally or exclusively be brought about in that the protective sleeve proposed by the invention is provided. In this case, it is impossible for there to be an operating state on spring fracture in which possibly both extensions are supported against one another, as a function of the direction of the centrifugal forces acting on both pipe parts. Instead the pipe part, to which the protective sleeve is not fixed, is supported on the protective sleeve when moved too far to the right or left by undesired centrifugal forces.

BRIEF DESCRIPTION OF THE DRAWINGS

Further features and advantages of the invention can be gathered from the following description of an embodiment relative to the attached drawings, wherein show.

Figure 1:
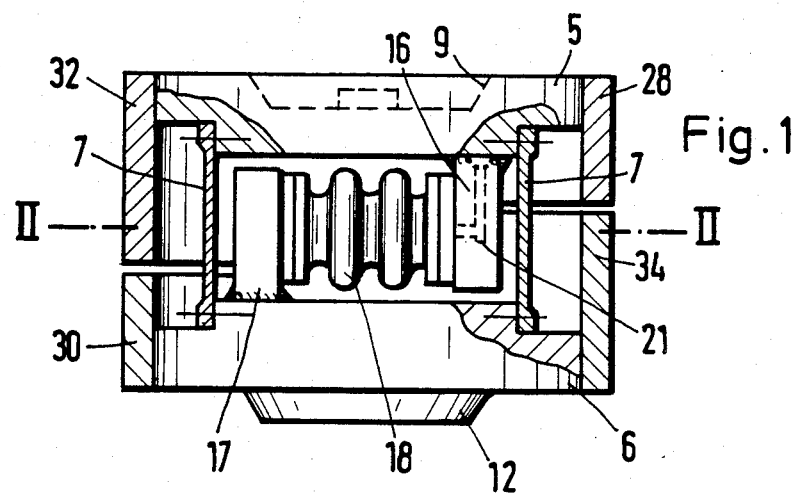
FIG. 1. An embodiment of a drill head according to the invention in axial section.
Figure 2:
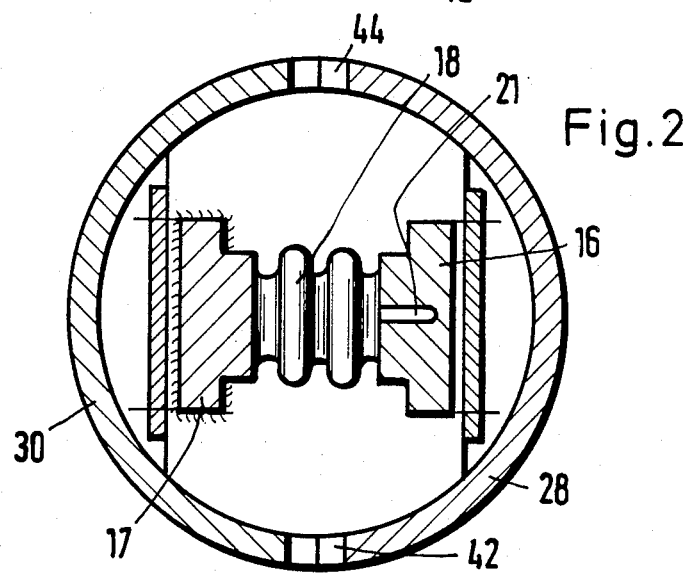
FIG. 2. The embodiment of FIG. 1 is section along line II—II of FIG. 1.

As can be gathered from the drawings, the feed mechanism (seen in FIG. 1) has an upper flange part 5, which is so connected by parallel springs 7 by means of screws to a lower flange part 6, that there can be small parallel displacements of the flange parts with respect to one another in a plane at right angles to the drill axis. The flange part 5 has an inner taper 9, which matches the not shown outer taper of the shaft of the drill head and can be fixed by not shown screws to the shaft flange. Flange part 6 has an outer taper 12, which corresponds to the drilling spindle taper. The not shown tool carrier can be fixed by means of screws or the like to the lower flange part 6.

Flange part 5 has an extension 16 and flange part 6 an extension 17, the two extensions 16, 17 being fixed, e.g. welded to the particular flange part 5, 6. An expansion member 18 is located between extensions 16, 17. The inner space of expansion member 18 is connected by a bore 21 to the hydraulic fluid connection.

The parts which have hitherto been described largely coincide to the construction of the drill head according to German Pat. No. 20 34 601 and reference is made to the description thereof for further explanation purposes.

Figure 3:
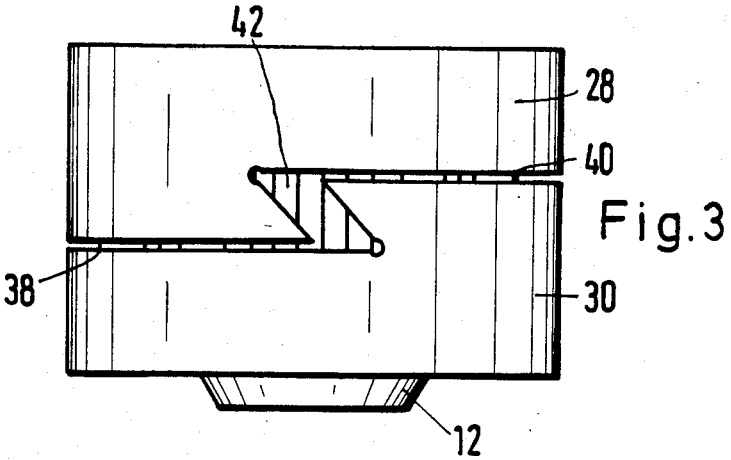
FIG. 3. The embodiment of FIGS. 1 and 2 in side view.

Unlike in the prior art, the drill head according to the embodiment of the invention shown in the drawings does not have a one-piece outer protective sleeve for the inner parts and instead the known protective sleeve is replaced by two separate pipe parts 28, 30, whereof pipe part 28 is fixed to flange part 5 and pipe part 30 to flange part 6. Facing the extension 16 welded to flange part 5, pipe part 28 has a compensating zone 32 of greater axial height than on the side of extension 16, whilst in the same way pipe part 30 is provided with a compensating zone 34. As can be seen in FIG. 3, pipe parts 28, 30 are separated from one another by a slot having two parallel portions 38, 40 and two connecting portions 42, 44, which are set back in sloping manner and connect the two portions 38, 40.

The feed mechanism functions in the following way. As the extension 16 to the right in the drawing is necessarily positioned outside the centre of flange part 1, on rotating about the central axis, it produces the forces acting to the right in the drawing. As a result of the central asymmetrical design of the upper pipe part 28, the unbalance to which flange part 5 is subject by extension 16 is compensated by the asymmetry of pipe part 28 shown in FIG. 3.

It can be clearly seen in the latter that the left-hand portion of pipe part 28 is heavier than its right-hand part. The asymmetry is just great enough for the centre of gravity of flange part 5, plus extension 16 to be just placed on the rotation axis. Due to the left-hand extension 17, flange part 6 is also not balanced with respect to the rotation axis. When the arrangement rotates about the axis, extension 17 leads to forces which attempt to move flange part 6 to the left. In order to compensate these forces, the flange part 6 is fixed to the asymmetrical pipe part 30, the centre of gravity of pipe part 30 being selected in such a way that it renders ineffective the unbalance of extension 17. It is clear that this is only possible in one position, which can be assumed at pressure zero. However, it is better to have an arrangement in which the complete balancing of the unbalance takes place at half the operating pressure of the feed mechanism, because then the faults caused by the residual unbalance are halved.

The drawings show that the slot 38, 40, 42, 44 in parallel portions 38, 40, in which it is at right angles to the axis, is relatively narrow, whereas in the axially parallel portions it is at sufficiently wide for the flange part 6 to undergo maximum deflection in undisturbed manner with respect to flange part 5. Due to the fact that the slot is not precisely axially parallel and is instead set back oblique to the axis, in the case of a possible fracture of parallel spring 7, it is ensured that lower flange part 6 cannot fly off and cause considerable risks and is instead secured either by hooking the lower pipe part 30 into the upper pipe part 28 or by reciprocal supporting of extensions 16 and 17.

Figure 4:
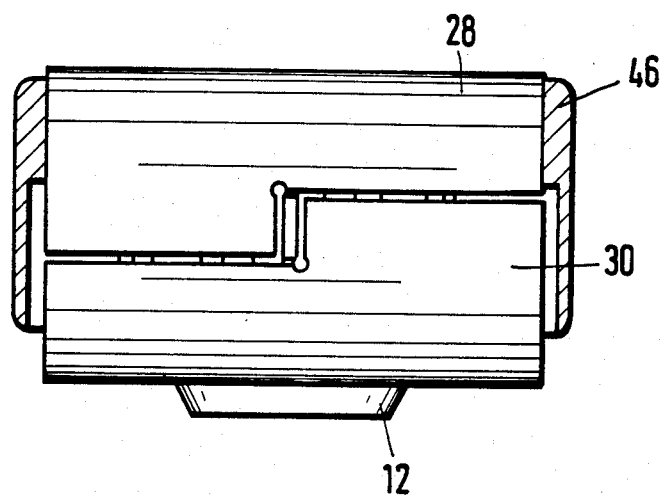
FIG. 4. A further embodiment of the invention in side view.

In the case of the embodiment of the invention shown in FIG. 4, the pipe parts 28, 30 are surrounded by a substantially cylindrical protective sleeve 46, which is fixed to the upper pipe part 28. In the vicinity of the lower pipe part 30, the protective sleeve 46 has an inner recess, so that its internal diameter is larger than the external diameter of the pipe part 30 by the extent that its unchanged relative movement with respect to pipe part 28 is ensured. Through the use of the protective sleeve 46, the pipe part 30 engages thereon to the left or right, as a function of the action direction of the centrifugal force.

The features of the invention disclosed in the above description, in the drawings and in the claims can be essential to the realization of the different embodiments of the invention, either individually or in random combinations.

We claim:

1. A revolving drill head or the like with finely adjustable tool carriers at right angles to its longitudinal axis having high rigidity material-elastic intermediate members operable by a hydraulic pressure medium supplied coaxially to the shaft of the drill head in a feed mechanism, which is positioned in fixed manner between the shaft and the tool carrier and having two flange-like connecting parts to the shaft or tool carrier connected by two axially parallel, resilient parts at right angles to the shaft axis as a parallel guide and with counter-directed, diametrically facing shaft axis parallel extensions which are symmetrical to and spaced from the shaft axis and between which is provided an expansion member comprising an elastic material intermediate member in a plane at right angles to the shaft axis, each of the flange-like connecting parts has a compensating device diametrically facing with respect to the shaft axis the extension fixed thereto for compensating its unbalance in at least one relative position of the one flange-like connecting part with respect to the other flange-like connecting part and the flange-like connecting parts are jointly surrounded by a split cylindrical sleeve, characterized in that the sleeve for forming the compensating means comprises two pipe parts (28), (30) with each pipe part having an eccentric center of gravity with respect to the shaft axis and wherein each is fixed to different ones of the flange-like connecting parts (5), (6) and wherein said pipe parts are movable in radially opposite directions to the extent of the relative movement of said flanges effected upon operation of the feed mechanism.

2. A drill head according to claim 1, characterized in that the pipe parts (28, 30) has substantially the same wall thickness throughout and over the circumference thereof have different heights, whilst producing in each case one axially projecting compensating zone (32, 34)

in the circumferential region diametrically facing the particular extension (16, 17).

3. Drill head according to claim 2, characterized in that the pipe parts (28, 30) are separated from one another by a slot, which in the circumferential region of the compensating zones (32, 34) has reduced axial height parallel portions (38, 40) essentially in a plane at right angles to the shaft axis and between which are located wider connecting portions (42, 44).

4. A drill head according to claim 3, characterized in that the connecting portions (42, 4) slope in set back manner with respect to the plane perpendicular to the shaft axis.

5. A drill head according to claim 4, characterized in that the angle of the path of the connecting portions (42, 44) to the plane at right angles to the shaft axis is approximately 45°.

6. A drill head according to one of the preceding claims, characterized by a protective sleeve (46) surrounding the pipe parts (28, 30) and which is fixed to one of the pipe parts (28) and whose internal diameter in the vicinity of the other pipe part (30) is greater than its external diameter by the amount necessary for the relative movement between the flange-like connecting parts (5, 6).

* * * * *